US008086440B2

(12) United States Patent
Elliot et al.

(10) Patent No.: US 8,086,440 B2
(45) Date of Patent: Dec. 27, 2011

(54) SYSTEM AND METHOD OF PRIORITIZING AUTOMATED TRANSLATION OF COMMUNICATIONS FROM A FIRST HUMAN LANGUAGE TO A SECOND HUMAN LANGUAGE

(75) Inventors: Russell Elliot, Endicott, NY (US); Jeffrey S. Poulin, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 964 days.

(21) Appl. No.: 12/074,941

(22) Filed: Mar. 7, 2008

(65) Prior Publication Data

US 2009/0099835 A1 Apr. 16, 2009

Related U.S. Application Data

(60) Provisional application No. 60/999,085, filed on Oct. 16, 2007.

(51) Int. Cl.
*G06F 17/28* (2006.01)
(52) U.S. Cl. ............. 704/2; 704/3; 704/4; 704/7; 704/8; 715/264
(58) Field of Classification Search .................. 704/2–8; 715/264; 707/706–708
See application file for complete search history.

(56) References Cited

U.S. PATENT DOCUMENTS

| | | | |
|---|---|---|---|
| 5,270,928 A | 12/1993 | Suzuki et al. | |
| 5,652,896 A | 7/1997 | Yamauchi et al. | |
| 6,104,989 A * | 8/2000 | Kanevsky et al. | ............... 704/9 |
| 6,219,646 B1 * | 4/2001 | Cherny | .................. 704/277 |
| 6,446,036 B1 * | 9/2002 | Bourbonnais et al. | ........... 704/3 |
| 6,470,307 B1 | 10/2002 | Turney | |
| 6,910,003 B1 * | 6/2005 | Arnold et al. | .................. 704/4 |

(Continued)

OTHER PUBLICATIONS

Wayne, Multilingual topic detection and tracking: Successful research enabled by corpora and evaluation, LREC, 2000, Citeseer, vol. 2000, pp. 1487-1494.*
Turmo et al, Adaptive information extraction, 2006, ACM Computing Surveys, vol. 38, pp. 1-47.*
Strassel et al, Multilingual Resources for Entity Extraction, 2003, Proceedings of the ACL 2003 workshop on Multilingual and mixed-language named entity recognition, vol. 15, pp. 49-56.*
Damianos, MiTAP for SARS Detection, 2004, Demonstration Papers at HLT-NAACL, pp. 13-16.*

*Primary Examiner* — David R Hudspeth
*Assistant Examiner* — Lamont Spooner
(74) *Attorney, Agent, or Firm* — Louis J. Franco; Leland D. Schultz

(57) ABSTRACT

A method of prioritizing the automated translation of communications relating to a predetermined topic includes capturing and inputting into a data processing system a translation-candidate communication rendered in a first human language. A first data set representative of the translation-candidate communication is stored in computer memory and parsed into communication sub-portions. Communication sub-portions are algorithmically selected for translation depending on their relatedness to the predetermined topic as determined by first-language extraction rules. Each selected communication sub-portion is translated to a translated-data-set sub-portion representative of that selected communication sub-portion in the second human language. Translated-data-set sub-portions are subjected to a secondary filtration process in accordance with which their relatedness to the predetermined topic is determined by second-language extraction rules. Those translated-data-set sub-portions determined to contain information sufficiently related to the predetermined topic, or a related sub-topic, are converted to converted-data-set sub-portions representative of the translated-data-set sub-portions in a human-intelligible format and outputted through a machine-to-human interface.

15 Claims, 5 Drawing Sheets

U.S. PATENT DOCUMENTS

| | | |
|---|---|---|
| 7,627,479 B2 * | 12/2009 | Travieso et al. .............. 704/277 |
| 7,970,598 B1 * | 6/2011 | Flanagan et al. .................. 704/2 |
| 2004/0102956 A1 * | 5/2004 | Levin ................................ 704/2 |
| 2004/0102957 A1 * | 5/2004 | Levin ................................ 704/3 |
| 2006/0106592 A1 | 5/2006 | Brockett et al. |
| 2006/0178866 A1 * | 8/2006 | Chiu et al. ........................ 704/2 |
| 2006/0200766 A1 | 9/2006 | Lakritz |
| 2006/0253273 A1 | 11/2006 | Feldman et al. |

* cited by examiner

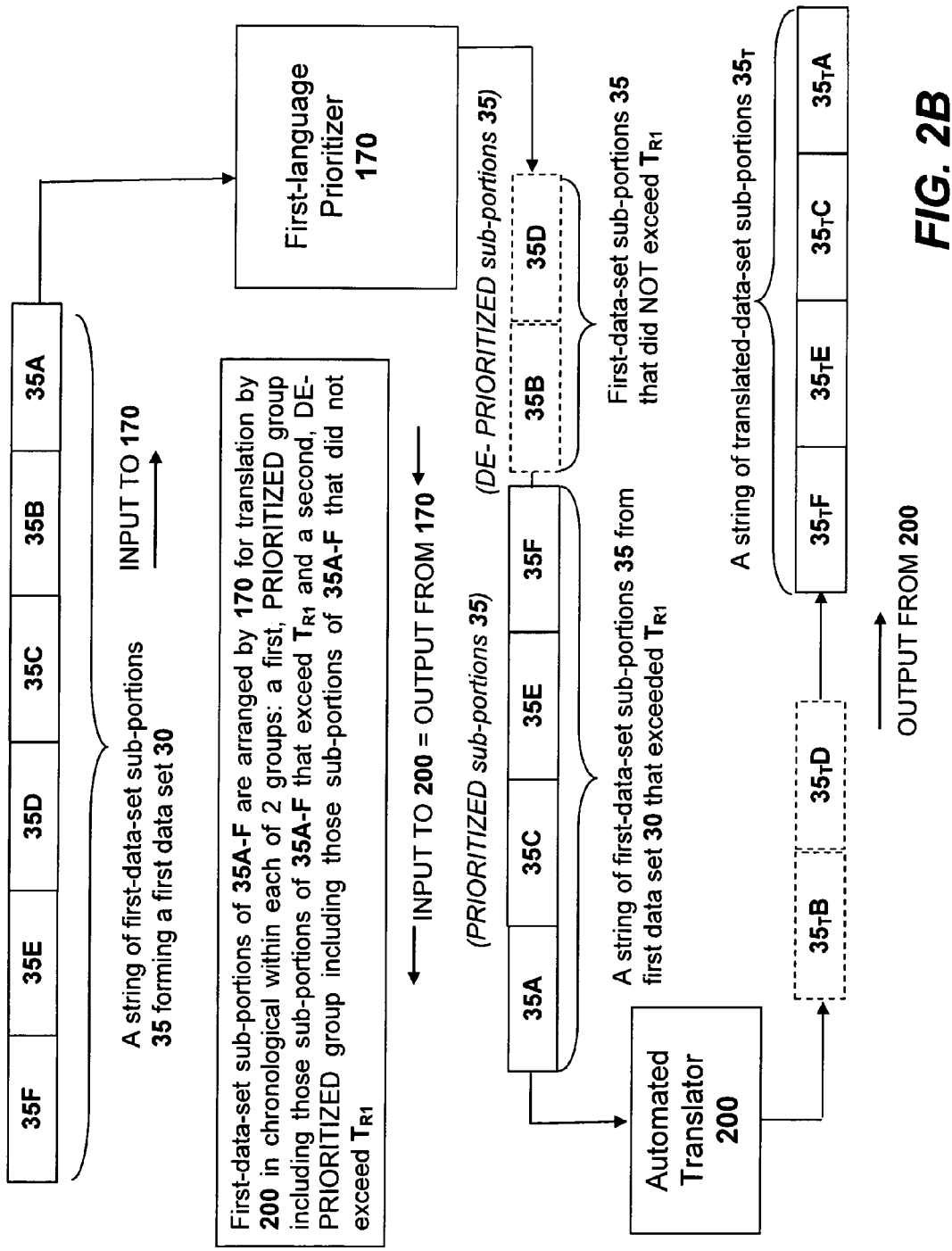

SYSTEM AND METHOD OF PRIORITIZING AUTOMATED TRANSLATION OF COMMUNICATIONS FROM A FIRST HUMAN LANGUAGE TO A SECOND HUMAN LANGUAGE

PROVISIONAL PRIORITY CLAIM

Priority based on Provisional Application Ser. No. 60/999,085, filed Oct. 16, 2007, and entitled "SYSTEM AND METHOD OF PRIORITIZING AUTOMATED TRANSLATION OF COMMUNICATIONS FROM A FIRST HUMAN LANGUAGE TO A SECOND HUMAN LANGUAGE," is claimed.

BACKGROUND

Surveillance analyst working for the military and various civilian agencies of the U.S. and various state governments intercept and store voluminous quantities of foreign-language communications requiring translation. The volume of foreign-language material requiring translation has increased greatly with stepped-up efforts to interrupt terrorist plots, enforce immigration laws and intercept traffic in illicit drugs and other contraband. The material requiring translation includes spoken messages and messages reduced to printed media, by way of example. Particularly vexing to the field of counterterrorism is the fact that the number of intelligence agents possessing both the necessary foreign language skills and the required security clearance is wholly inadequate relative to the volume of foreign-language message traffic requiring translation and analysis. One can readily appreciate that significant delay in the translation of key communications could result in the successful execution of additional terror strikes.

Surveillance personnel and analysts currently implement automated (i.e., computer-based) translators for translating spoken or written communications from a first human language to a second human language. As helpful as automated translators are, they still yield unwieldy volumes of translated information for native speakers of the second human language to process. Accompanying information of interest in the translated product are large amounts of information unrelated to the purpose for which surveillance is being conducted. In other words, precious automated and human resources are currently dedicated to the translation and analysis of unimportant information; a fact that increases monetary costs and, more importantly, introduces delay in the production of intelligible mission-critical information. A principal reason for this delay is that the automated translators currently in use translate the entirety of a communication rendered in the first human language to the second human language. Moreover, the translation is performed on a first-in-first-out basis such that, for example, outputted to an analyst is a transcript of the original communication translated to the second human language in the order in which it was originally rendered and with all of the important and unimportant content intermingled.

Based on the foregoing, there exists a need for a system and method of prioritizing the automated translations of communications from a first human language to a second human language in order to render more efficient and expedient the use of human and machine-based analytical resources.

SUMMARY

Various implementations of the invention relate to the optimization of automated and human resources dedicated to the translation from a first human language to a second human language of communications rendered by persons under surveillance. As explained in the background, human and machine-based resources are currently dedicated to the translation of communications that are wholly unrelated to the subject matter of a particular investigation and/or are entirely innocuous. Common to alternative implementations of the present invention is the goal of obviating translation of communications unrelated to a mission-specific purpose or, in some alternative versions, to prioritize the translation workflow such that communications determined to relate to a particular mission-specific topic are translated prior to unrelated communications. For example, if the U.S. Drug Enforcement Administration (DEA) is intercepting telephonic human communications in a first (non-English) language relating to the imminent movement of drugs from, for example, Miami to interior parts of the United States, it is undesirable to expend resources translating portions of the communications amounting to "small talk" between drug-trafficking operatives. Implementations of the invention will find particular use in the field of counter-terrorism where the number of intelligence agents possessing both the necessary foreign language skills and the required security clearance is lacking.

In accordance with an illustrative method of prioritizing automated translation of a potentially interesting communication (hereinafter "translation-candidate communication) from a first human language, in which the communication is originally rendered, to a second human language, the translation-candidate communication is captured and inputted to a data processing system through a communication-input device. Because the communication may be in any of various audio or textual forms, the communication-input device may include, by way of non-limiting example, at least one of (i) a microphone; (ii) an image scanner; (iii) a link to a wiretap; (iv) a camera and (v) a modem. A signals and storage manager associated with the data processing system determines the type of medium the communication was rendered in and tags stored data representative thereof for conversation by a media converter. The media converter, which, in a typical implementation, is a computer program, converts the "raw" data representative of the inputted communication into a predetermined machine-intelligible format and a first data set representative of the contents of the translation-candidate communication in the first human language is stored in computer memory in the predetermined machine-readable format.

Data representative of translation-candidate communications (e.g., the first data set described above) are communicated to a first-language prioritizer that, in essence, serves as a data filter that separates data relevant to a predetermined mission-specific topic (e.g., terror plots, weapons, insurgent movements) from data that is irrelevant to the predetermined topic. In a typical implementation, the first-language prioritizer is a computer program in association with which there is maintained in computer memory a consultable first-language prioritization protocol including data indicative of a set of first-language extraction rules. As the first-language prioritizer operates on a data set representative of a translation-candidate communication, portions of the data set (hereinafter referred to as communication sub-portions) are algorithmically analyzed and "filtered" based on consultation with the first-language prioritization protocol. More specifically, a data set representative of each communication sub-portion is one of (i) extracted and (ii) rejected for translation depending on whether that selected communication sub-portion is algorithmically determined to exceed a first relevancy threshold indicative of the relatedness of the communication sub-portion to the at least one predetermined topic of interest. In some alternative versions, communication sub-portions rejected for translation are either erased (deleted) from memory or archived in computer memory in case subsequent translation is deemed desirable.

In other alternative implementations programmed to translate the entirety of a translation-communication candidate, those communication sub-portions exceeding a first relevancy threshold are selected for translation prior to those communication sub-portions not exceeding the first relevancy threshold. In other words, in versions of the latter type, communication sub-portions exceeding the first relevancy threshold are prioritized for translation and those not exceeding the first relevancy threshold are de-prioritized for later translation. In still additional versions, multiple relevancy thresholds (or "sub-thresholds") may be defined within a first relevancy-threshold set according to which communication sub-portions are one of (i) prioritized, (ii) de-prioritized, and (iii) rejected for translation. It will be appreciated that prioritization and de-prioritization may be sub-divided even further into "high priority," "moderate priority," "low priority" and "lowest priority" schemes by way of non-limiting example. One way of prioritizing those communication sub-portions selected for translation is to tag each communication sub-portion with a data tag indicative of its suspected importance relative to other selected communication sub-portions such that a translation order is established among the communication sub-portions. For purposes of clarity and simplicity of explanation, illustrative methods are further described with primary reference to a version in which a communication sub-portion is either rejected or selected for translation depending on algorithmic analysis vis-à-vis a first relevancy threshold.

As to a communication sub-portion that is selected for translation in accordance with the first relevancy threshold, or a relevancy threshold within a first relevancy-threshold set, based on consultation with the first-language prioritization protocol, that sub-portion of the machine-readable first data set representative of the relevant communication sub-portion in the first human language is caused to be translated to a translated-data-set sub-portion representative, in a machine-readable format, of the relevant communication sub-portion in the second human language. More specifically, each relevant sub-portion of the machine-readable first data set is communicated, or otherwise rendered accessible, to an automated translator for translation to a translated-data-set sub-portion. The automated translator is typically a computer program to which the data processing system has access.

In alternative implementations, the filtration performed by the first-language prioritizer reduces demand on translation resources because either (i) only communication sub-portions of interest are translated or (ii) when all communication sub-portions are translated, they are translated in an order indicative of decreasing priority. In either event, the information most important to an analyst's job is processed more quickly. In determining which communication sub-portions to translate and/or in what order to translate them, the first-language prioritizer of various implementations employs a "working knowledge" of various idiosyncrasies of the first language including, for example, variations among local and regional dialects and jargon. The use of foreign-language rules renders the first/foreign-language prioritizer substantially more effective in correctly identifying items of interest in the initial collection and differentiation then, for example, the translation of a greater amount of data to which, for example, second/English-language rules are applied. The first-language prioritizer of various versions is updatable through at least one feedback path so that, for example, as human analysts and programmers learn more about the first language from which they wish to translate communications, they can introduce updates to the first-language extraction rules implemented as part of the first-language prioritization protocol. Moreover, if persons under surveillance adopt a code word to replace an otherwise suspicious word of interest (e.g., "candle" for "shoulder-fired rocket"), the first-language prioritizer can be updated to regard the code word as a term of interest thereby triggering selection for translation of that word and of surrounding words in order to provide context. The first-language extraction rules may also include recognizers that trigger selection for translation communication sub-portions including words or terms that are apparently "out of place" based on the context provided by surrounding language. For instance, if it is "known" to the first-language prioritizer that a group of operatives under surveillance is planning a meeting in Minnesota in January and one of the parties states, in the first/foreign language, "we'll bring the wine to the picnic," an intensively programmed prioritizer would regard the foreign word for "picnic" as a suspicious term in light of the cold Minnesota climate in the month of January, and recognize that the entire phrase ought to be translated and communicated to an analyst for further investigation as to what was meant by "picnic" and, for that matter, "wine."

Machine-readable, translated-data-set sub-portions generated by an automated translator are rendered accessible to an output converter. An output converter converts translated-data-set sub-portions into converted-data-set sub-portions representative of the translated-data-set sub-portions in a human-intelligible format that is outputted through a machine-to-human interface. The output product may be communicated to a human through various alternative machine-to-human interfaces including, by way of non-limiting example, at least one of (i) a computer-monitor screen, (ii) a printer linked to a computer, and (iii) a speaker.

Although in various implementations the translated-data-set sub-portions are, in their entireties, converted and outputted in the order in which they were translated and converted, various versions implement a secondary filtration process through a second-language extractor. Like the first-language prioritizer, the second-language extractor is typically embodied in a computer program accessible to the data processing system. The second-language extractor of a typical implementation performs its functions between the time a communication sub-portion in the first human language is caused to be translated to a translated-data-set sub-portion and conversion of data contained therein into a human-intelligible format. The second-language extractor selects and groups segments of a translated-data-set sub-portion for prioritized conversion, de-prioritized conversion or non-conversion based on consultation with a second-language prioritization protocol including data indicative of a set of second-language extraction rules. The second-language extraction rules may incorporate, and selectively implement, tunable instructions that are more closely related to a specific mission than are the first-language extraction rules. One advantage of providing a tunable second-language extractor is that a balance may be struck between over-rejection or over-de-prioritization in the first instance relative to the selection of communication sub-portions for translation and generating too much irrelevant output through the machine-to-human interface relative to a specific mission. The tunability of the second-language extractor permits, for example, an analyst who communicates only in the second language to select for conversion portions of a translated and archived communication that are most relevant to his specific mission. For example, while the first-language prioritizer may have selected for translation all communications determined to relate in any way to weapons, drugs, and a pending terrorist plot, a DEA agent who speaks only English may tune the second-language extractor so that the ultimate converted output communicated through the machine-to-human interface relates to the drug aspects of the communication. Like the first-language prioritizer of various versions, the second-language extractor of various implementations is updatable to incorporate new rules relating to, for instance, dialects, colloquialisms, and code terms and may be in other aspects analogous to the first-language prioritizer.

Although alternative versions of the invention employ a variety of input and output devices, at least one data processing system, and multiple data archives and computer programs, it is to be understood that these various components may be physically separated from one another by great distances. By way of very specific example, military or civilian intelligence personnel may capture a communication over a microphone in one part of Iraq and forward that communication for translation in the United States via a wireless link. Translated and/or converted data may be subsequently communicated to computing devices in possession of the original senders or to some third group of personnel in a third location. Accordingly, while the communication-input device(s), prioritizer(s), translator(s), converter(s) and machine-to-human interface(s) must be communicatively linked in some way, these various components may be incorporated in different data processing systems situated in disparate geographic locations. Hence, for example, the reference to "a data processing system," indicates "at least one data processing system.

Representative implementations are more completely described and depicted in the following detailed description and the accompanying drawings.

BRIEF DESCRIPTION OF THE DRAWINGS

FIG. 2B illustrates a prioritization scheme according to which the entirely of a translation-candidate communication is translated and some sub-portions of the communication are selected for translation prior to other, de-prioritized communication sub-portions based on determinations of relevancy to a predetermined topic;

DETAILED DESCRIPTION

The following description of automated language-translation processes and architecture, and various implementations thereof, is demonstrative in nature and is not intended to limit the invention or its application of uses.

Figure 1:
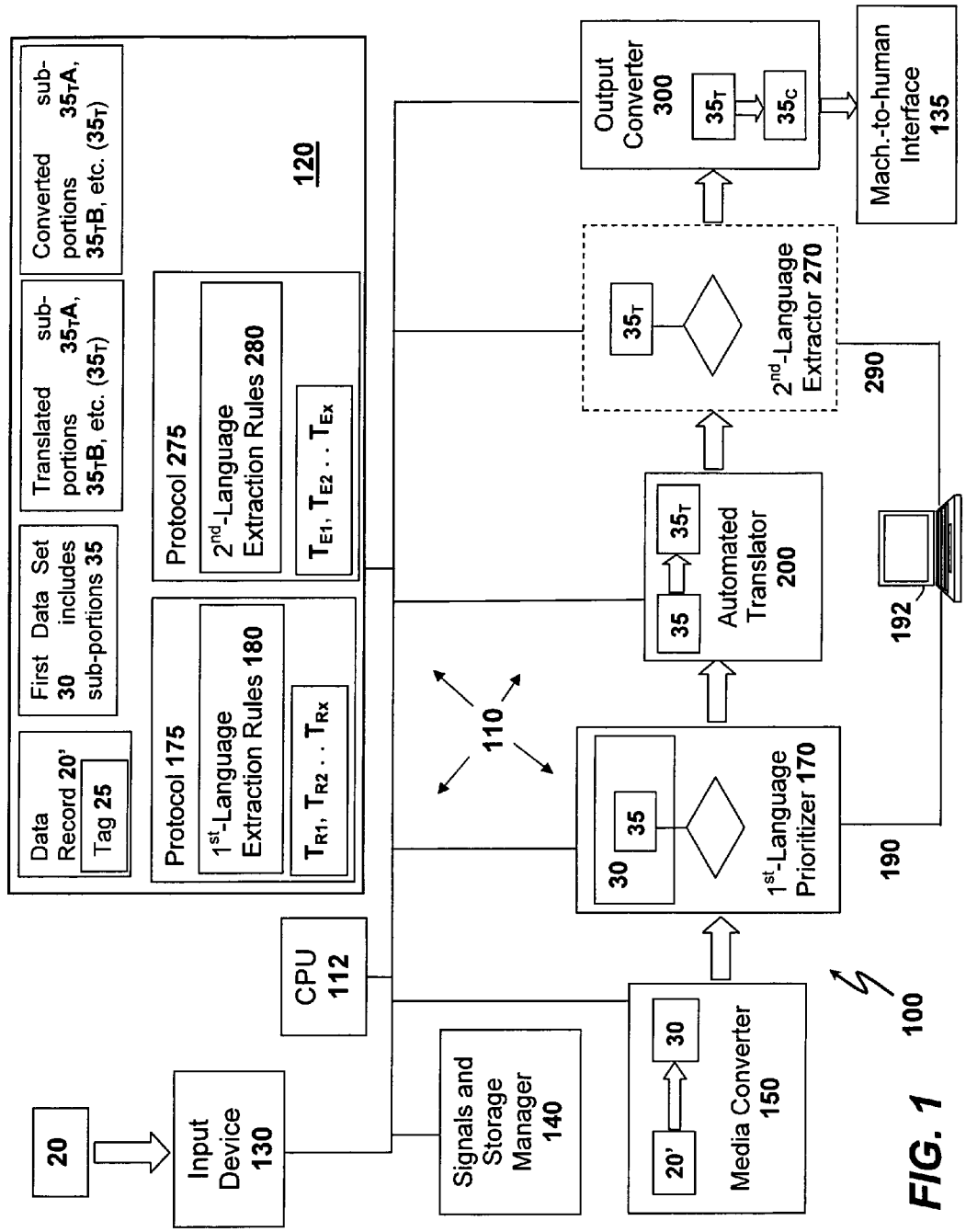
FIG. 1 is a block diagram of a system and architecture for the automated translation of communications rendered in a first human language to an output intelligible in a second human language.

Referring to the function-block schematic of FIG. 1, an illustrative automated language-translation system 100 includes access to a data processing system 110. The data processing system 110 includes a central processing unit (CPU) 112 that is communicatively linked to a memory 120, a communication-input device 130 through which a communication in a first human language is inputted into the translation system 100 for translation, and a machine-to-human interface 135 through which communications translated to a second human language are outputted in a human-intelligible format. Between the inputting of a communication in the first human language and the outputting of that communication in the second human language, stored data representative of that communication is algorithmically analyzed and processed by various components of the language-translation system 100. For purposes of explaining various details of the functionality and interrelatedness of the architectural components of an illustrative language-translation system 100, consideration is given below to an illustrative translation process relative to a first-language communication.

Referring still to FIG. 1, a generically represented first-language communication 20 is captured and inputted to the data processing system 110 through a communication-input device 130. The nature of the communication-input device 130 will be alternatively determined by the manner in which a person under surveillance renders the communication 20. More specifically, the first-language communication 20 may be rendered audibly or be text-based, for example. Accordingly, in order to facilitate processing of variously-communicated messages, the communication-input device 130 includes at least one of (i) a microphone; (ii) an image scanner; (iii) a link to a wiretap; (iv) a camera and (v) a modem, by way of non-limiting example.

The captured first-language communication 20, or "translation-candidate communication 20," is processed by a signals and storage manager 140 associated with the data processing system 110. The signals and storage manager 140 ascertains the type of medium through which the first-language communication 20 was rendered and a data record 20' representative thereof is stored in computer memory 120 with an appropriate, medium-indicative data tag 25. A media conversion program 150 (hereinafter "media converter 150") associated with the data processing system 110 converts the "raw" data record 20' representative of the inputted communication 20 into a predetermined machine-readable format and a first data set 30 representative of the contents of the translation-candidate communication in the first human language is stored in computer memory 120 in the predetermined machine-readable format.

The first data set 30 is parsed into first-data-set sub-portions 35 correspondingly representative of communication sub-portions (not shown) of the translation-candidate communication 20 and communicated to a first-language prioritizer 170 that differentiates portions of the first data set 30 relevant to a predetermined mission-specific topic from portions that are irrelevant to the predetermined topic. As mentioned in the summary, the first-language prioritizer 170 of a typical implementation is a computer program in association with which there is maintained in computer memory 120 a consultable first-language prioritization protocol 175 including data indicative of set of first-language extraction rules 180. As the first-language prioritizer 170 operates on the first data set 30, first-data-set sub-portions 35 representing communication sub-portions are algorithmically analyzed and "filtered" based on consultation with the first-language prioritization protocol 175. More specifically, a first-data-set sub-portion 35 representative of each communication sub-portion is one of (i) extracted and (ii) rejected for translation depending on whether that selected communication sub-portion is algorithmically determined to exceed a first relevancy threshold $T_{R1}$ indicative of the relatedness of the communication sub-portion to the at least one predetermined topic of interest. In some alternative versions, first-data-set sub-portion 35 representing communication sub-portions rejected for translation are either erased (deleted) from computer memory 120 or archived in computer memory 120. In FIG. 1, the diamond associated with the first-language prioritizer 170 indicates that a decision is rendered by the first-language prioritizer 170 relative to each first-data-set sub-portion 35.

Each first-data-set sub-portion 35 of the machine-readable first data set 30 corresponding to a communication sub-portion determined to be relevant based on consultation with the first-language prioritization protocol 175, and in accordance with the first relevancy threshold $T_{R1}$, is communicated, or otherwise rendered accessible, to an automated translator 200 for translation to a translated-data-set sub-portion $35_T$ representative, in a machine-readable format, of the relevant communication sub-portion in the second human language. The diagrams of FIGS. 2A through 2D depict illustrative alternative processing schemes of a first-language prioritizer 170 relative, in each case, to a first data set 30 comprising a string of first-data-set sub-portions 35A-F. The illustrative prioritization schemes represented in FIGS. 2A and 2D demonstrate how demand on an automated translator 200 is decreased and how relevant information can be processed before less relevant or irrelevant information. Each of the illustrative processing schemes of FIGS. 2A through 2D is considered briefly in turn and is to be regarded as illustrative and, therefore, non-limiting of the manner in which data may be prioritized and/or selected for translation.

Figure 2A:
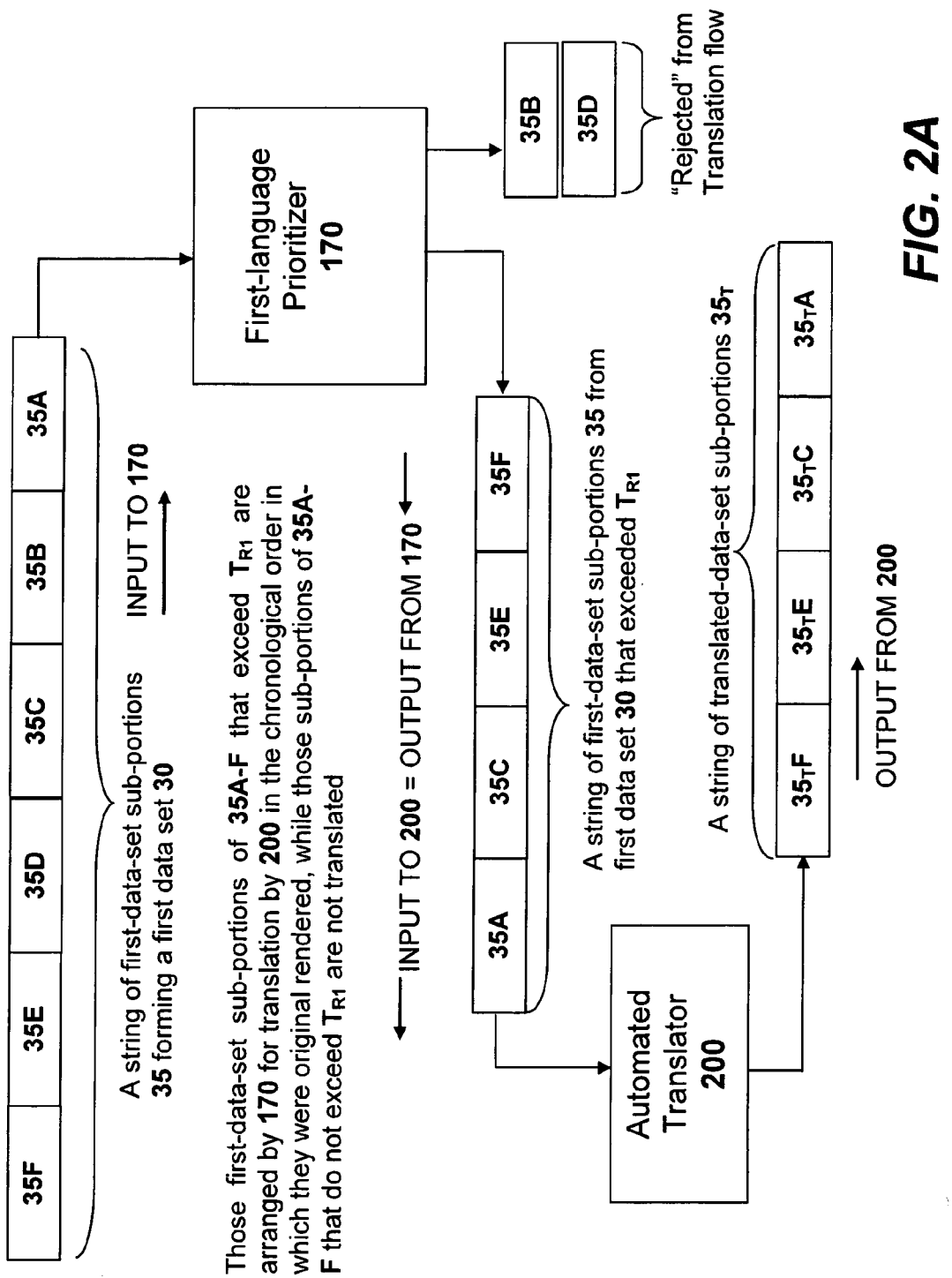
FIG. 2A schematically depicts an illustrative prioritization protocol in accordance with which constituent sub-portions of a translation-candidate communication are segregated for translation or non-translation depending on determined relevance to a predetermined topic of investigation.

Referring to the illustrative prioritization scheme of FIG. 2A, a first-data set 30 comprising a string of six first-data-set sub-portions 35A-F is communicated to first-language prioritizer 170 with the sub-portions 35A-F being fed for processing in the order in which they were originally rendered as indicated by the alphabetic portions (i.e., A, B, C . . . F) of the reference characters 35A-F. With reference to the first-language prioritization protocol 175, and a first relevancy threshold $T_{R1}$, the first-language prioritizer 170 parses the first data set 30 to select for translation only the first-data-set sub-portions 35 corresponding to the most interesting communication sub-portions as determined by the first-language prioritization protocol 175. In the example of FIG. 2A, each of the first-data-set sub-portions 35A-F is either selected for translation or "rejected" from the translation workflow depending on whether the relevancy of that first-data-set sub-portion 35 exceeds or does not exceed the first relevancy threshold $T_{R1}$. In this particular illustration, first-data-set sub-portions 35B and 35D have been rejected for translation, while first-data-set sub-portions 35A, C, E and F exceeded the first relevancy threshold $T_{R1}$ and have been communicated to the automated translator 200. In the processing scheme of FIG. 2A, no protocol is indicated for prioritizing the translation among those first-data-set sub-portions 35 selected for translation and, therefore, they are simply presented (i.e., inputted) to the automated translator 200 in the relative order in which they were originally rendered. The output from the automated translator 200 comprises a string of translated-data-set sub-portions $35_T$A, $35_T$C, $35_T$E, and $35_T$F representing, in a machine-readable format, the content of the first-data-set sub-portions 35A, C, E and F in the second human language.

In accordance with an alternative first-language prioritization protocol 175 illustrated in the schematic of FIG. 2B, each of the first-data-set sub-portions 35A-F is communicated for translation. However, among the first-data-set sub-portions 35A-F, those that are determined to exceed the first relevancy threshold $T_{R1}$ are associated with a first group prioritized for translation by the translator 200 prior to a second group of de-prioritized sub-portions 35 including the first-data-set sub-portions (i.e., 35B and D) that did not exceed the first relevancy threshold $T_{R1}$. In this particular scheme, the first-data-set sub-portions 35 within each of the prioritized and de-prioritized groups are simply translated in the relative chronological order in which they were originally rendered. The dash-bound boxes associated with first-data-set sub-portions 35B and D are indicative of the de-prioritized status of sub-portions 35B and D.

Figure 2C:
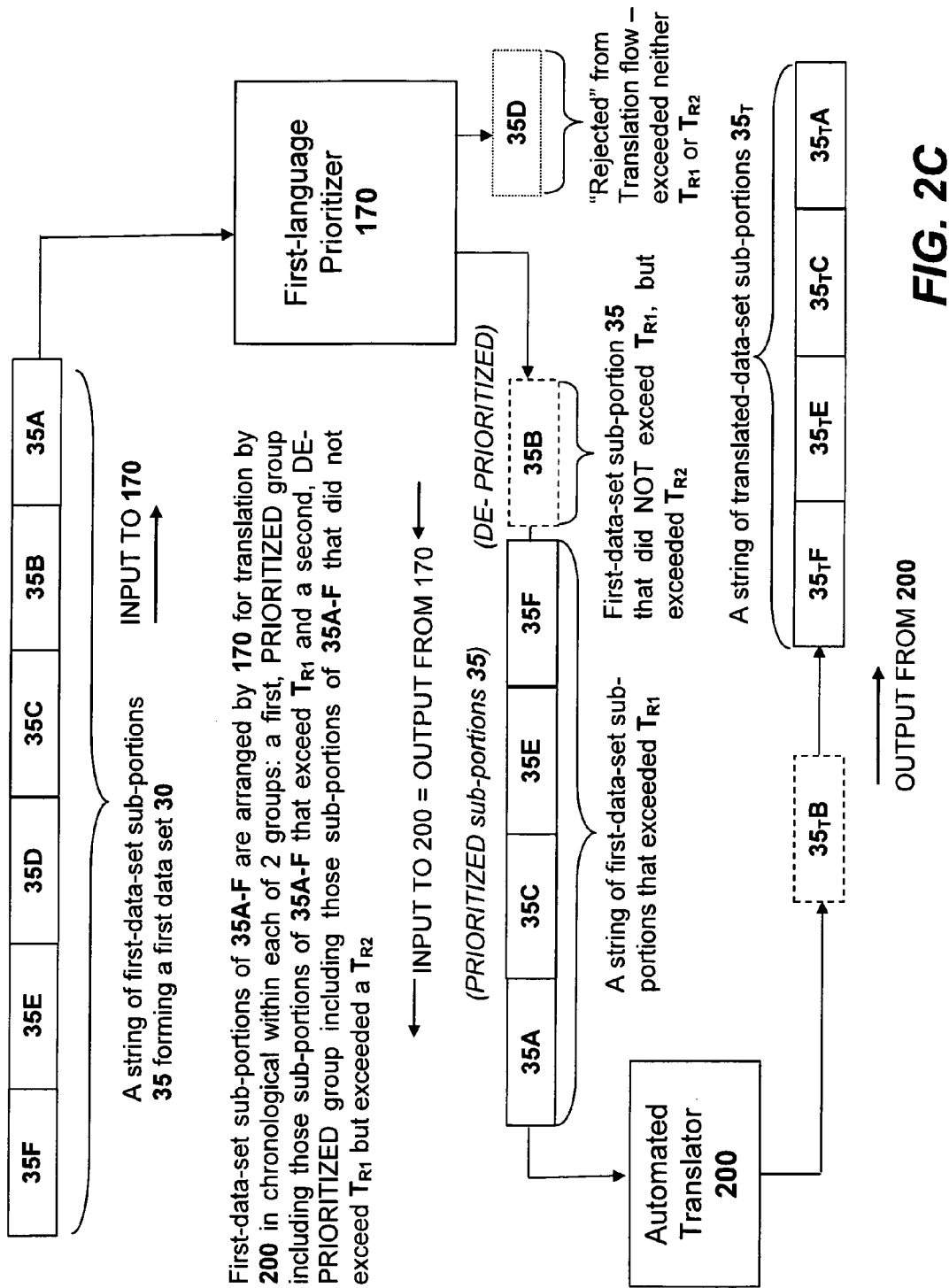
FIG. 2C is a schematic showing a third illustrative prioritization protocol according to which communication sub-portions are selected for (i) prioritized translation, (ii) de-prioritized translation and (iii) non-translation depending on determined relatedness to a predetermined topic.

With reference to FIG. 2C, in a third illustrative prioritization scheme, each of the first-data-set sub-portions 35A-F is one of (i) rejected from the translation-processing flow or (ii) communicated for translation as one of (a) a prioritized first-data-set sub-portion 35 or (b) a de-prioritized first-data-set sub-portion 35. In the example of FIG. 2C, prioritized sub-portions 35A, C, E and F are differentiated from de-prioritized sub-portion 35B on the basis of sub-portions A, C, E and F exceeding a first relevancy threshold $T_{R1}$ not exceeded by de-prioritized sub-portion 35B or rejected sub-portion 35D. De-prioritized sub-portion 35B is distinguished from rejected sub-portion 35D on the basis of de-prioritized sub-portion 35B exceeding a second relevancy threshold $T_{R2}$ that, while lower than the first relevancy threshold $T_{R1}$, is not exceeded by the rejected sub-portion 35B. That the prioritized sub-portions 35A, C, E and F are more relevant (i.e., more important) to a particular inquiry than the de-prioritized sub-portion 35B is reflected in the stated fact that the first relevancy threshold $T_{R1}$ is "more difficult" to exceed than the second relevancy threshold $T_{R2}$.

Figure 2D:
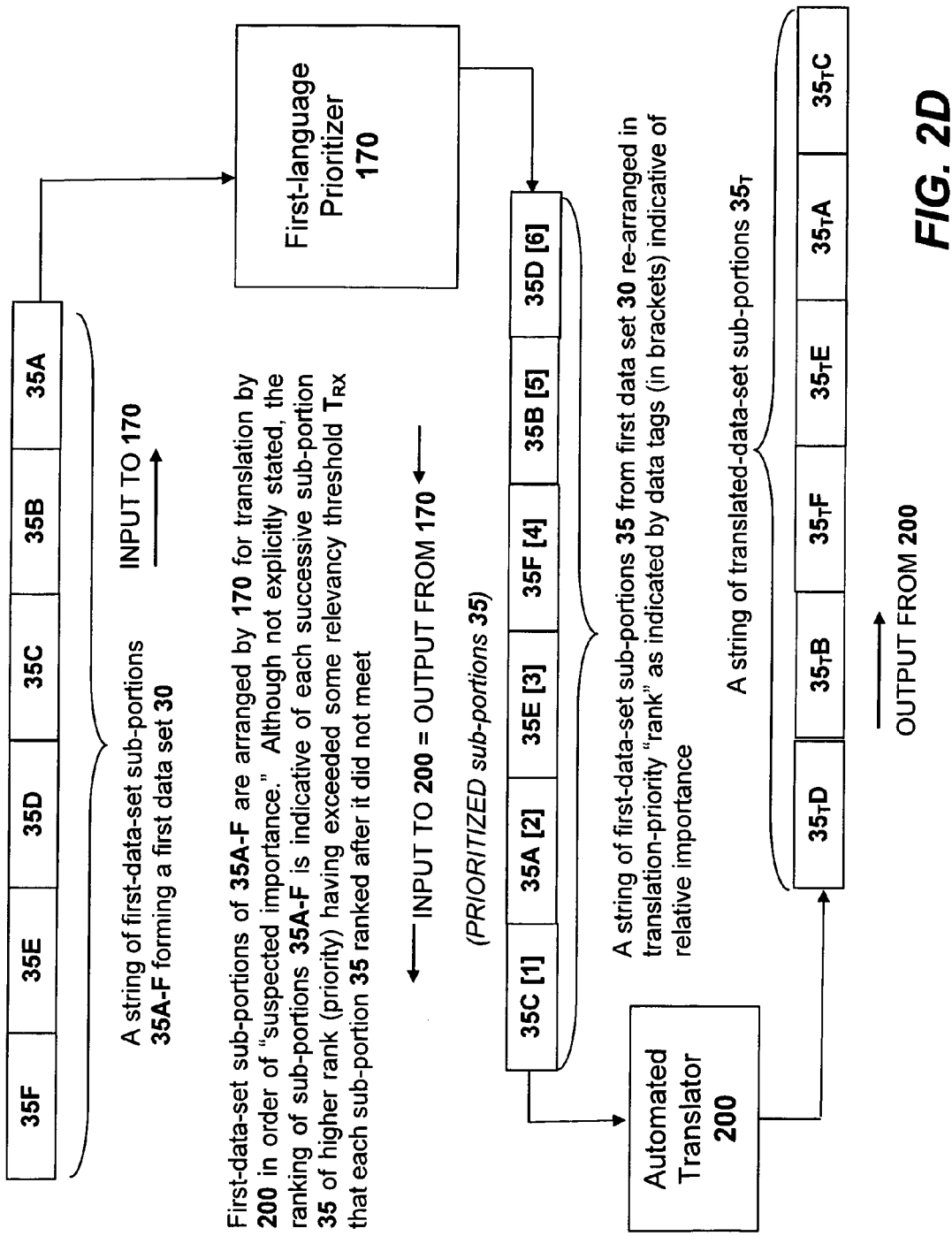
FIG. 2D is a schematic showing a refined prioritization process according to which communication sub-portions are ranked for relevancy to a predetermined topic and tagged with indicia that determine the order in which the communication sub-portions are to be translated.

In accordance with still a fourth illustrative prioritization scheme described in association with the schematic of FIG. 2D, each of the first-data-set sub-portions 35A-F is selected for translation, but a prioritization protocol 175 that is highly-refined relative to the protocol (schemes) associated FIGS. 2A through 2D "ranks" each of first-data-set sub-portions 35A-F in accordance with its "suspected importance" relative to the other first-data-set sub-portions 35 included in the first data set 30. As shown in FIG. 2D, a priority-indicative data tag (indicated by a bracketed digit) is associated with each first-data-set sub-portion 35 and serves as an instruction to the translator 200 as to the order in which translation of the first-data-set sub-portions 35A-F are to be translated. It will be appreciated that data-tagging in accordance with "rank" effectively distinguishes among the first-data-set sub-portions 35 in accordance with a plurality of relevancy thresholds $T_{RX}$ wherein x can assume a value of between 1 and $X_{max}$, and $X_{max}$ has a value equal to 1 less than the number of first-data-set sub-portions 35 included within a first data set 30, for example.

In some implementations, the first-data-set sub-portions 35 are arbitrarily selected and represent equi-durational sub-portions of the translation-candidate communication. For instance, if in each of the examples discussed above in conjunction with FIGS. 2A through 2D, the first data set 30 comprises machine-readable data representative of a 1-minute dialogue between two operatives, the first-language prioritizer 170 may be programmed to process and analyze the first data set 30 such that each of the first-data-set sub-portions 35A-F comprises data representative of 10 seconds of the 1-minute dialogue wherein, for example, first-data-set sub-portion 35A begins at T=0 sec. and first-data-set sub-portion 35F concludes at T=60 sec. In alternative implementations, however, the first-language prioritizer 170 may select for translation first-data-set sub-portions 35 of disparate durations by, for example, searching for predetermined key words and phrases (i.e., "terms") and then, in order to provide context to the same, selecting for inclusion within a first-data-set sub-portion 35 including a predetermined key term, data representative of a portion of the dialogue for predetermined durations prior and subsequent to utterance of the key term. By way of still more detailed illustration, a first-language prioritizer 170 may be programmed such that, when it identifies the first-language word for "explosive," it includes within a first-data-set sub-portion 35 data corresponding to portions of the dialogue occurring 5 seconds prior and 5 seconds subsequent to the utterance, in the first language, of the term "explosive." In this instance, a first-data-set sub-portion 35 of 10 seconds duration has been algorithmically defined and "temporally centered" upon the predetermined key term "explosive."

As explained in the summary, the first-language prioritizer 170 uses rules of speech and/or writing, dialects and colloquialisms unique to the first language and therefore is far more effective in arriving at a correct interpretation of a communication than is possible by, for example, translating as literally and closely as practicable into the second language a translation-candidate communication 20 and relying exclusively on rules of the second language to glean meaning, context and intent. Referring again to the schematic of FIG. 1, the first-language prioritizer 170 of various implementations is updatable through at least one feedback path 190 including a human-to-machine interface 192. Illustrative human-to-machine interfaces 192 include at least one of (i) a keyboard, (ii) a microphone, and (iii) a camera. As human analysts learn more about first languages from which they wish to produce translation-candidate communications, persons can interface with the first-language prioritizer 170 in order to add rules to the first-language prioritization protocol 175. As explained in the summary, programmers can also add rules to account for the adoption by targeted operatives of apparently innocuous code words to refer to subject matter of interest to investigators. The first-language prioritizer 170 of alternative illustrative versions can be updated not only through the input of text, but also the input of images (e.g., reference photos of investigation targets) and/or sound (e.g., voice samples).

As illustrated in FIG. 1, machine-readable, translated-data-set sub-portions $35_T$ generated by the automated translator 200 are rendered accessible to an output converter 300 that converts translated-data-set sub-portions $35_T$ into converted-data-set sub-portions $35_C$ representative of the translated-data-set sub-portions $35_T$ in a human-intelligible format that is outputted through a machine-to-human interface 135. Alternative machine-to-human interfaces 135 through which the converted data product can be outputted may include, by way of non-limiting example, at least one of (i) a computer-monitor screen, (ii) a printer linked to a computer, and (iii) a speaker. As indicated in the summary, while in some versions the full contents of the translated-data-set sub-portions $35_T$ are converted and outputted in the order in which they were translated and converted, alternative versions include a second-language extractor 270 that facilitates secondary algorithmic data filtration prior to at least the outputting of the converted-data-set sub-portions $35_C$ through the machine-to-human interface 135 and, in a typical version, prior to the conversion of translated-data-set sub-portions $35_T$ to converted-data-set sub-portions $35_C$. In a typical version, a second-language extractor 270 is in many aspects analogous to a typical first-language prioritizer 170 except that the second-language extractor 270 selects and groups translated-data-set sub-portions, and segments (e.g., sub-sub-portions) thereof, for at least one of (i) conversion, (ii) non-conversion, (iii) prioritized conversion, and (iv) de-prioritized conversion based on consultation with a second-language prioritization protocol 275. In a manner analogous to the first-language prioritization protocol 175, the second-language prioritization protocol 275 includes data indicative of a set of second-language extraction rules 280 that reference a set of predetermined extraction thresholds (e.g., $T_{E1}, T_{E2} \ldots T_{EX}$), as shown in FIG. 1. As with the previously-described relevancy thresholds, disparate extraction thresholds are indicative of disparate levels (e.g., higher or lower) relatedness to a predetermined topic and are accordingly indicative of a relative order in which translated-data-set sub-portions $35_T$ are to be converted or of whether a particular translated-data-set sub-portion $35_T$ should be converted at all.

In aspects analogous to the relevancy thresholds (e.g., $T_{RX}$) discussed previously in general association with FIG. 1, and particular association with the illustrative selection schemes of FIGS. 2A though 2D, the set of extraction thresholds may include a single threshold (e.g., $T_{EX}$) that delineates relative priority for conversation among translated-data-set sub-portions $35_T$ or between conversion and non-conversion of a translated-data-set sub-portions $35_T$. Additionally, the set of extraction thresholds may include at least first and second thresholds $T_{E1}$ and $T_{E2}$ that define a prioritization scheme within a system in which all translated-data-set sub-portions $35_T$ are to be converted or a prioritization scheme in which all translated-data-set sub-portions $35_T$ except those not exceeding a predetermined lowest extraction threshold (e.g., $T_{EX}$) are to be converted. It will be appreciated that in versions in which all translated-data-set sub-portions $35_T$ are to be converted, each translated-data-set sub-portion $35_T$, by definition, exceeds at least one extraction threshold $T_{EX}$. In various versions in which translated-data-set sub-portions $35_T$ are rejectable for conversion, a rejected translated-data-set sub-portion $35_T$ is either (i) deleted or (ii) maintained in computer memory 120.

The second-language extraction rules 280 may incorporate, and selectively implement, tunable instructions that, for example, are more closely related to a specific mission than are the first-language extraction rules 180 applied under a particular set of circumstances. Moreover, like the first-language prioritizer 170 of various versions, the second-language extractor 270 (e.g., the second-language prioritization protocol 275) is updatable through a feedback path 290 including a human-to-machine interface such as 192 to incorporate new rules relating to, for instance, dialects, accents, colloquialisms, code terms, images, and sound samples, and may be in other aspects analogous to the first-language prioritizer 170.

The foregoing is considered to be illustrative of the principles of the invention. Furthermore, since modifications and changes will occur to those skilled in the art without departing from the scope and spirit of the invention, it is to be understood that the foregoing does not limit the invention as expressed in the appended claims to the exact construction, implementations and versions shown and described.

What is claimed is:

1. A method of prioritizing for automated translation from a first human language to a second human language communications relating to at least one predetermined topic, the method comprising:

capturing and inputting into a data processing system a translation-candidate communication rendered in the first human language and storing in computer memory associated with the data processing system, in a predetermined machine-readable format, a first data set representative of the contents of the translation-candidate communication in the first human language;

maintaining in computer memory a first-language prioritization protocol including data indicative of first-language extraction rules according to which a selected first-data-set sub-portion representative of a communication sub-portion of the translation-candidate communication is algorithmically one of extracted and rejected for translation depending on whether the selected communication sub-portion exceeds a first relevancy threshold indicative of the relatedness of the communication sub-portion to the at least one predetermined topic;

consulting the first-language prioritization protocol and algorithmically analyzing, in accordance with the first-language extraction rules, the first data set in order to determine whether at least one communication sub-portion associated with the first data set exceeds the first relevancy threshold;

selecting for translation to the second human language each communication sub-portion algorithmically determined to exceed the first relevancy threshold; and rejecting for translation to the second human language each communication sub-portion algorithmically determined not to exceed the first relevancy threshold; wherein (a) as to a communication sub-portion selected for translation, the method further comprises causing that sub-portion of the machine-readable first data set representative of the relevant communication sub-portion in the first human language to be translated to a translated-data-set sub-portion representative, in a machine-readable format, of the relevant communication sub-portion in the second human language;

converting at least a portion of the translated-data-set sub-portion into a converted-data-set sub-portion representative of at least a portion of the translated-data-set sub-portion in a human-intelligible format; and outputting through a machine-to-human interface the converted-data-set sub-portion; and (b) as to a communication sub-portion rejected for translation, the method further comprises one of deleting from and archiving in computer memory the first-data-set sub-portion representative of that communication sub-portion.

2. The method of claim 1 further comprising parsing the first data set into first-data-set sub-portions correspondingly representative of equi-durational communication sub-portions of the translation-candidate communication.

3. The method of claim 2 wherein the first-data-set sub-portions are arbitrarily selected.

4. The method of claim 2 wherein each first-data-set sub-portion represents a communication sub-portion temporally centered upon at least one predetermined key term.

5. The method of claim 1 wherein the first-language prioritization protocol is updatable through at least one feedback path including a human-to-machine interface.

6. The method of claim 5 wherein the first-language prioritization protocol is updatable through the input of at least one of text, images, and sound.

7. A method of prioritizing for automated translation from a first human language to a second human language communications relating to at least one predetermined topic, the method comprising:

capturing and inputting into a data processing system a translation-candidate communication rendered in the first human language and storing in computer memory associated with the data processing system, in a predetermined machine-readable format, a first data set representative of the contents of the translation-candidate communication in the first human language;

parsing the first data set into first-data-set sub-portions correspondingly representative of communication sub-portions of the translation-candidate communication;

maintaining in computer memory a set of relevancy thresholds including at least first and second relevancy thresholds indicative of the relatedness of a communication sub-portion to the at least one predetermined topic, wherein the first relevancy threshold indicates a greater degree of relatedness to the at least one predetermined topic than does the second relevancy threshold;

maintaining in computer memory a first-language prioritization protocol including data indicative of first-language extraction rules according to which a selected first-data-set sub-portion is algorithmically one of (i) extracted and prioritized for translation; (ii) extracted and de-prioritized for translation and (iii) rejected for translation depending on whether the selected communication sub-portion, respectively, (a) exceeds the first relevancy threshold, (b) exceeds the second relevancy threshold, but not the first relevancy threshold, and (c) exceeds neither of the first and second relevancy thresholds;

consulting the first-language prioritization protocol and algorithmically analyzing, in accordance with the first-language extraction rules, the first data set in order to determine whether at least one communication sub-portion of the translation-candidate communication associated with the first data set exceeds either of the first and second relevancy thresholds;

selecting for translation to the second human language each communication sub-portion algorithmically determined to exceed either of the first and second relevancy thresholds; and rejecting for translation to the second human language each communication sub-portion algorithmically determined not to exceed either of the first and second relevancy thresholds; wherein as to each communication sub-portion determined to exceed at least one of the first and second relevancy thresholds, the method further comprises causing the first-data-set sub-portion representative of that communication sub-portion in the first human language to be translated to a translated-data-set sub-portion representative, in a machine-readable format, of that communication sub-portion in the second human language;

a first-data-set sub-portion representative of a communication sub-portion determined to exceed the first relevancy threshold is translated to a translated-data-set sub-portion prior to a first-data-set sub-portion representative of a communication sub-portion determined to exceed the second relevancy threshold and not the first relevancy threshold; and as to a communication sub-portion rejected for translation, the method further comprises one of deleting and archiving in computer memory the first-data-set sub-portion representative of that communication sub-portion.

8. The method of claim 7 wherein the first-language prioritization protocol is updatable through at least one feedback path including a human-to-machine interface.

9. The method of claim 7 wherein the first data set is parsed into first-data-set sub-portions representative of equi-durational communication sub-portions of the translation-candidate communication.

10. The method of claim 9 wherein the first-data-set sub-portions are arbitrarily selected.

11. The method of claim 9 wherein each first-data-set sub-portion represents a communication sub-portion temporally centered upon at least one predetermined key term.

12. The method of claim 7 further comprising:
converting at least a portion of each translated-data-set sub-portion into a converted-data-set sub-portion representative of at least a portion of the translated-data-set sub-portion in a human-intelligible format; and
outputting through a machine-to-human interface the converted-data-set sub-portion.

13. The method of claim 7 further comprising:
maintaining in computer memory a second-language prioritization protocol including data indicative of second-language extraction rules according to which at least a sub-portion of a selected translated-data-set sub-portion is selected for one of conversion, non-conversion, prioritized conversion, and (iv) de-prioritized conversion into a converted-data-set sub-portion representative of at least a portion of the translated-data-set sub-portion in a human-intelligible format depending on whether the selected translated-data-set sub-portion exceeds at least one predetermined extraction threshold;
consulting the second-language prioritization protocol and algorithmically analyzing, in accordance with the second-language extraction rules, at least one translated-data-set sub-portion associated with the first data set in order to determine whether the at least one translated-data-set sub-portion exceeds at least one predetermined extraction threshold;
selecting for conversion each translated-data-set sub-portion algorithmically determined to exceed at least one extraction threshold; and rejecting for conversion each translated-data-set sub-portion algorithmically determined not to exceed at least one extraction threshold; wherein
as to each translated-data-set sub-portion selected for conversion, the method further comprises converting at least a portion of the translated-data-set sub-portion into a converted-data-set sub-portion representative of at least a portion of the translated-data-set sub-portion in a human-intelligible format and outputting through a machine-to-human interface the converted-data-set sub-portion; and
as to a translated-data-set sub-portion rejected for conversion, the method further comprises one of deleting from and maintaining in computer memory the translated-data-set sub-portion.

14. The method of claim 13 wherein
the second-language prioritization protocol references at least two extraction thresholds indicative of mutually disparate levels of relatedness to a predetermined topic; and
a first translated-data-set sub-portion that exceeds an extraction threshold indicative of a higher level of relatedness to the predetermined topic than the highest extraction threshold exceeded by a second translated-data-set sub-portion is converted prior to the second translated-data-set sub-portion.

15. The method of claim 13 wherein at least one of the first-language prioritization protocol and the first-language prioritization protocol is updatable through at least one feedback path including a human-to-machine interface through which can be inputted of at least one of text, images, and sound.

* * * * *